United States Patent Office 2,714,409
Patented Aug. 2, 1955

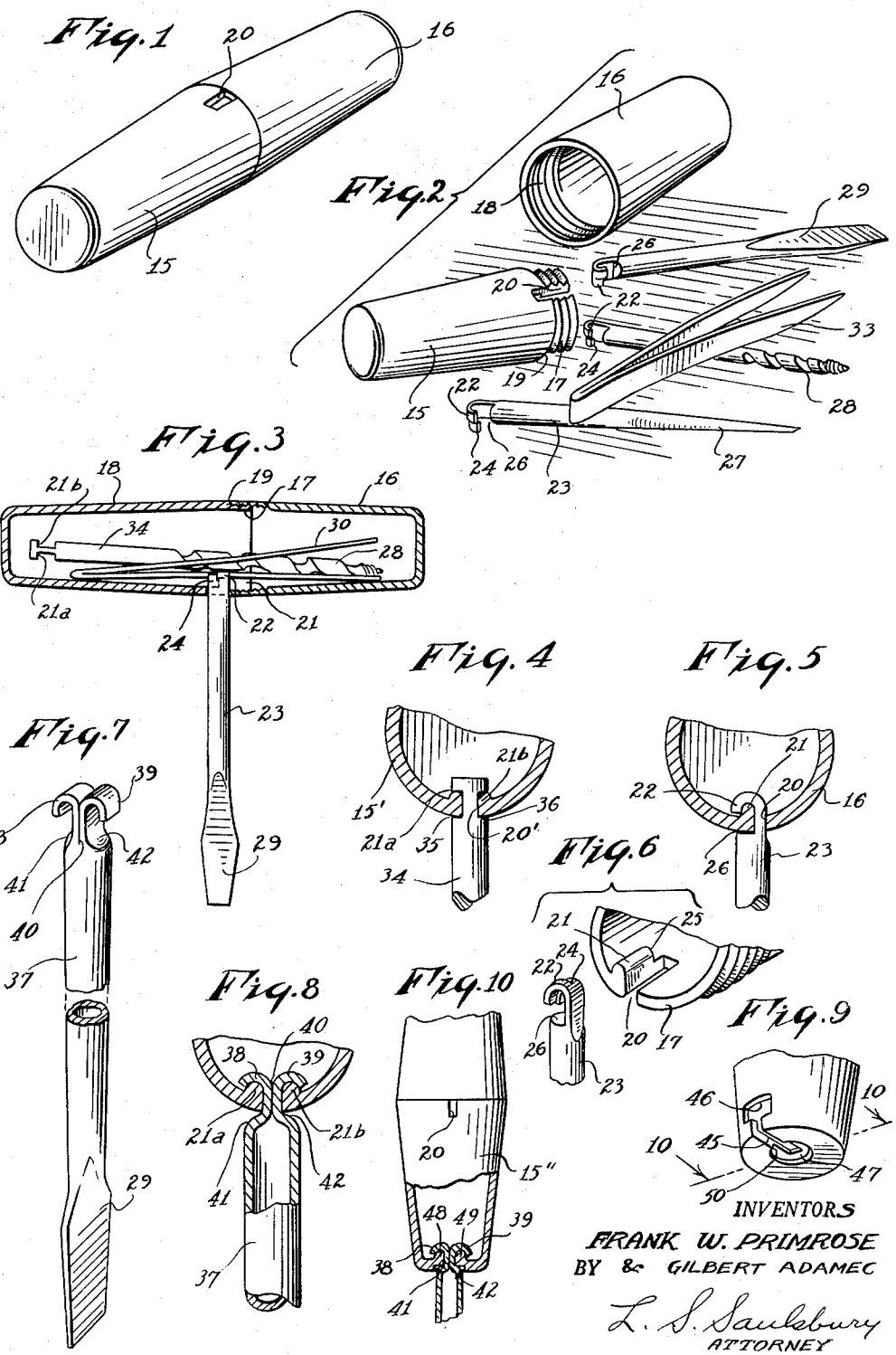

2,714,409

TOOL HANDLE

Frank W. Primrose, Brooklyn, and Gilbert Adamec, Bronx, N. Y.; said Adamec assignor to said Primrose Application March 16, 1953, Serial No. 342,316

1 Claim. (Cl. 145—62)

This invention relates to tool handles.

It is an object of the present invention to provide a tool handle having separable handle parts wherein a part having a notch therein will receive a tool shank and is reinforced adjacent the sides of the notch with raised ribs over which the retaining portions of the tool are extended and secured.

Another object of the invention is to provide in a handle a connection a tool adjacent a notch of one handle part so that upon the disengagement of the other handle part, the tool will not readily slide out of the notch but will be held on the handle part by a simple formation on the tool adapted to spring over the end of a rib, it will be retained on the handle part against free displacement therefrom upon the handle parts being separated, only slight pressure being necessary to secure the tool to the handle part and to remove the same therefrom.

It is another object of the invention to provide a tool handle tool which may be easily formed of hollow stock and in such a manner that opposing hook-like formations are formed on the shank of the tool.

It is another object of the invention to provide a tool handle in which the end of one of the handle parts is adapted to receive a tool so that the tool will extend coaxially with the handle part and wherein the tool, when fixed on the handle part, will be held against lateral displacement and easy removal therefrom.

Other objects of the invention are to provide a handle and tool therefor which is of simple construction, inexpensive to manufacture, durable, compact, of pleasing appearance, convenient to use and efficient in operation.

For a better understanding of the invention, reference may be had to the following detailed description taken in connection with the accompanying drawing, in which:

Figure 1 is a perspective view of the handle and tools with the handle parts connected together and the tools disposed therein;

Fig. 2 is a collective and perspective view of the tool handle parts separated and the tools removed therefrom;

Fig. 3 is a sectional view taken through the handle with one of the tools secured between the parts thereof;

Fig. 4 is an enlarged fragmentary sectional view of one of the handle parts with one form of tool shank connected over the raised internal ribs;

Fig. 5 is a sectional view of a still further form of tool shank secured to a handle part where the handle part has but one raised rib;

Fig. 6 is a collective and perspective view of the tool and handle part assembly shown in Fig. 5;

Fig. 7 is a perspective view of a tool having a still further form of shank and with opposed hook formations;

Fig. 8 is a sectional view showing the attachment of the opposing hook formations of the tool of Fig. 7 connected to a handle part and over the double ribs thereof;

Fig. 9 is a fragmentary perspective view of a handle part having a slot in the end thereof for receiving a double hook tool;

Fig. 10 is a fragmentary sectional view taken generally on line 10—10 of Fig. 9 with the tool in place in the end of the handle part.

Referring now to the figures, 15 and 16 represent respectively the tool handle parts. These parts are tapered and rounded on their ends and when joined together, provide a smooth handle. The handle part 15 has a reduced diameter threaded portion 17 on to which threads 18 of handle part 16 are fixed. The end of the handle part 16 will abut a shoulder 19 when the handle parts are completely secured together.

In the open end of the handle part 15 is a notch 20 that extends throughout the length of the threaded portions 17 and into the body of the handle part 15. According to one form of the invention, one side of the notch 20 is reinforced by an inwardly extending rib 21 over which a hook formation 22 of a tool element 23 is extended, Figs. 5 and 6. The hook formation 22 of the tool element 23 has an inwardly bent retaining portion 24 which can be sprung downwardly over end face 25 of rib 21 so as to hold the tool element against outward displacement from the notch or slot 20 at the time that the parts are being assembled. The hook formation 22 will extend preferably into the body of the handle part and beyond the threaded portion 17 in order that the end face of the handle part 16 will engage shoulder part 19. Slight pressure will be necessary in order to spring the retaining portion 24 to pass over the rib 21 and engage with the end thereof and also to remove the tool element from the rib. The retaining portion 24 will be deflected outwardly to conform to the rib shape during both the insertion and the removal of the tool element. The tool element 23 has a shoulder 26 underlying the hook formation 22 that engages with the outer edge of the notch and prevents inwardly displacement of the tool element into the handle part. It will be thus apparent that the tool element may be of any of the conventional types such as shown in Fig. 2 and have its ends shaped either as an awl as indicated at 27 or an auger as indicated at 28 or as a screw driver as indicated at 29. The handle parts may contain other tool elements such as a small pair of tweezers 30.

In Fig. 4, there is shown the handle part as indicated at 15' formed with a notch 20' and having two reinforcing ribs 21a and 21b. With the two ribs the two sides of the notch 20' are adequately reinforced. The handle part will then accommodate a tool element 34 having opposing notches 35 and 36 adapted to receive the sides of the slot or notch 20'. The length of these recesses or notches 35 and 36 is sufficient to accommodate the the ribs 21a and 21b.

In Figs. 7 and 8, there is shown a double hook formation on the end of a tool element 37. This formation comprises upwardly extending hook formations 38 and 39 arranged in back to back relationship and adapted to ride over respectively the respective reinforcing ribs 21a and 21b. These hook formations 38 and 39 can be formed from hollow tool stock. A slit can be prepared in a hollow stock piece as indicated at 40, the severed ends can be flattened or rolled and thereafter bent to provide the hook formations 38 and 39. Lying respectively below the formations 38 and 39 will be shoulder formations 41 and 42 adapted to hold the tool element against inward displacement into the handle part. This tool element 37 will fit on the handle part as clearly illustrated in Fig. 8.

If desired, the hook formations 38 and 39 can be slit to provide spring retaining portions similar to that shown in Figs. 2, 5 and 6. Such retaining portions would respectively extend over the ends of the two ribs respectively 21a and 21b.

In Figs. 9 and 10 there is shown a handle part 15" which has its end provided with a key slot 45 extending from one side of the body of the handle part 15" with an enlargement 46 through which the two hook formations 38 and 39 may be extended and running over the end of the part and into the center thereof. At the center of the end of the part where the tool element is finally lodged, there is a depression 47 providing ribs 48 and 49 over which the respective hook formations 38 and 39 may extend. The hook formations 38 and 39 may have some spring action in order to engage with the ribs 48 and 49 and in such a manner as to hold shoulders 41 and 42 tightly against the underface of the depressed portion 47 and in such a manner as to be retained against side wall 50 of the depressed portion 47. In this manner the tool is held against outward displacement through the slot 45.

It should now be apparent that there has been provided a tool handle having handle parts with a slot that is reinforced with a rib and wherein the tool has hook formations adapted to extend over the rib in such a manner as to grip the rib and according to the form of the invention shown in Figs. 2, 3, 5 and 6 adapted to extend over the end face of the rib to lock the same against outward displacement from the slot as at times when the tool is being applied to the handle and the other tools adapted to be contained in the handle are loose and free to escape therefrom. It should also be apparent that there has been provided in a tool handle a slot in the end of one of the handle parts adapted to receive the tool element so that the handle can be used for quick action and in the same manner that a screw driver handle is used and to allow the gimlet to be used in places that would ordinarily interfere with the operation of the handle and gimlet when used in a true gimlet fashion.

While various changes may be made in the detail construction, it shall be understood that such changes shall be within the spirit and scope of the present invention, as defined by the appended claim.

What is claimed is:

A tool handle comprising separable hollow handle parts, one of said handle parts having a closed end, an externally threaded open end and a slot extending inwardly from the open end, a rib portion extending inwardly along one side of the slot, the second of said handle parts having a closed end and an internally threaded open end adapted to mate with the threaded end of said first handle part, and a tool element having a hook formation extendable into the slot and over the inwardly extending rib, said hook formation having a depressed retaining portion adapted to be sprung over the rib, said rib having an end shoulder face over which the retaining portion is seated when the tool element is extended into the end of the slot and said tool element having a shoulder engaging with the outer surface of the handle part to prevent the inward displacement of the tool element.

References Cited in the file of this patent

UNITED STATES PATENTS

| | | |
|---|---|---|
| 133,440 | Griswold | Nov. 26, 1872 |
| 287,809 | Devereux | Nov. 6, 1883 |
| 512,384 | Meacham | Jan. 9, 1894 |

FOREIGN PATENTS

| | | |
|---|---|---|
| 96,909 | Switzerland | Nov. 16, 1922 |
| 513,872 | France | Feb. 25, 1921 |
| 532,341 | France | Nov. 21, 1921 |